(12) United States Patent
Liu et al.

(10) Patent No.: US 11,902,953 B2
(45) Date of Patent: Feb. 13, 2024

(54) CARRIER SWITCHING METHOD, APPARATUS, AND SYSTEM FOR MULTI-CARRIER COMMUNICATION

(71) Applicant: Huawei Technologies Co., Ltd., Shenzhen (CN)

(72) Inventors: Zhe Liu, Shanghai (CN); Fan Wang, Shanghai (CN); Guohua Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/064,174

(22) Filed: Dec. 9, 2022

(65) Prior Publication Data

US 2023/0164754 A1 May 25, 2023

Related U.S. Application Data

(63) Continuation of application No. 16/874,761, filed on May 15, 2020, now Pat. No. 11,540,278, which is a (Continued)

(30) Foreign Application Priority Data

Nov. 17, 2017 (CN) .......................... 201711148290.4

(51) Int. Cl.
*H04W 72/0453* (2023.01)
*H04L 5/00* (2006.01)
(Continued)

(52) U.S. Cl.
CPC ....... *H04W 72/0453* (2013.01); *H04L 5/0048* (2013.01); *H04W 72/21* (2023.01); *H04W 72/23* (2023.01)

(58) Field of Classification Search
None
See application file for complete search history.

(56) References Cited

U.S. PATENT DOCUMENTS 11,540,278 B2 *  12/2022  Liu ................. H04L 5/0098
2017/0302419 A1  10/2017  Liu et al.
(Continued)

FOREIGN PATENT DOCUMENTS

| CN | 102845109 A | 12/2012 |
| CN | 107317660 A | 11/2017 |
| WO | 2017050155 A1 | 3/2017 |

OTHER PUBLICATIONS

"3rd Generation Partnership Project; Technical Specification Group Radio Access Network; NR;User Equipment (UE) radio transmission and reception; Part 1: Range 1 Standalone (Release 15)", 3GPP TS 38.101-1 V0.2.0 (Oct. 2017), total 35 pages.
(Continued)

*Primary Examiner* — Clemence S Han
(74) *Attorney, Agent, or Firm* — Slater Matsil, LLP

(57) ABSTRACT

This application discloses a carrier switching solution for multi-carrier communication. A network device sends configuration information to a terminal. The configuration information includes first uplink carrier information and second uplink carrier information. The first uplink carrier information indicates that a first uplink carrier is an SRS switching-from uplink carrier. The second uplink carrier information indicates that a second uplink carrier is an SRS switching-to uplink carrier. At least one of the first uplink carrier and the second uplink carrier belongs to a cell including a supplementary uplink (SUL) carrier. The terminal may determine the SRS switching-from uplink carrier and the SRS switching-to uplink carrier in a plurality of configured uplink carriers based on the configuration information.

20 Claims, 5 Drawing Sheets

Related U.S. Application Data continuation of application No. PCT/CN2018/116032, filed on Nov. 16, 2018.

(51) Int. Cl.
*H04W 72/21* (2023.01)
*H04W 72/23* (2023.01)

(56) References Cited

U.S. PATENT DOCUMENTS

| | | | | |
|---|---|---|---|---|
| 2018/0287846 A1* | 10/2018 | Kim | ...................... | H04W 72/20 |
| 2019/0199555 A1* | 6/2019 | Munier | ................. | H04L 5/0051 |
| 2019/0246427 A1* | 8/2019 | Mukherjee | ........ | H04W 74/0808 |
| 2019/0260487 A1* | 8/2019 | Kazmi | ................. | H04B 17/382 |
| 2020/0092055 A1* | 3/2020 | Choi | ....................... | H04L 5/005 |
| 2020/0274657 A1* | 8/2020 | Deenoo | ................. | H04W 76/27 |
| 2020/0274750 A1* | 8/2020 | Yi | ....................... | H04L 27/2659 |
| 2020/0281022 A1* | 9/2020 | Pelletier | ............ | H04W 72/0453 |
| 2020/0305186 A1* | 9/2020 | Alfarhan | ........... | H04W 72/0446 |
| 2020/0322187 A1* | 10/2020 | He | ..................... | H04W 72/0446 |
| 2020/0396654 A1* | 12/2020 | Freda | .................... | H04W 36/06 |
| 2022/0417804 A1* | 12/2022 | Freda | .................... | H04W 36/30 |

OTHER PUBLICATIONS

"3rd Generation Partnership Project; Technical Specification Group Radio Access Network; New Radio(NR); Requirements for support of radio resource management (Release 15)", 3GPP TS 38.133 V0.3.0 (Nov. 2017), total 25 pages.

"3rd Generation Partnership Project; Technical Specification Group Radio Access Network; NR; Physical layer procedures for data (Release 15)", 3GPP TS 38.214 V1.0.0 (Sep. 2017), total 32 pages.

"3rd Generation Partnership Project; Technical Specification Group Radio Access Network; NR; NR and NG-RAN Overall Description; Stage 2 (Release 15)", 3GPP TS 38.300 V1.2.0 (Nov. 2017), total 60 pages.

"3rd Generation Partnership Project; Technical Specification Group Radio Access Network; NR;Radio Resource Control (RRC); Protocol specification (Release 15)", 3GPP TS 38.331 V0.1.0 (Oct. 2017), total 42 pages.

Liu, J et al. "Advanced Carrier Aggregation Techniques for Multi-Carrier Ultra-Dense Networks", IEEE Communications Magazine, Jul. 2016, 7 pages.

Huawei, "List of agreements for SRS Carrier-Based Switching", RAN WG1 Meeting #86bis, R1-1611067, Lisbon, Portugal, Oct. 10-14, 2016, 12 pages.

Huawei, "List of agreements for SRS Carrier-Based Switching", RAN WG1 Meeting #87, R1-1613787, Reno, USA, Nov. 14-18, 2016, total 15 pages.

Huawei, HiSilicon, "Specification Impacts to Support SRS Carrier based Switching", 3GPP TSG-RAN WG1#84b R1-162586, Apr. 11-15, 2016, 5 pages, Busan, Korea.

Huawei, HiSilicon, "Initial access and uplink operations with SUL", 3GPP TSG RAN WG1 Meeting #90, R1-1712165, Prague, Czech Republic, Aug. 21-25, 2017, 6 pages.

Huawei et al., "Other issues on NR CA and DC including SRS switching and Sul", 3GPP TSG RAN WG1 Meeting #90bis, R1-1717080, Prague, Czech Republic, Oct. 9-13, 2017, total 9 pages.

Huawei, HiSilicon, "HARQ/CSI feedback and scheduling timing for SUL", 3GPP TSG RAN WG1 #90b R1-1717097, Oct. 9-13, 2017, 8 pages, Prague, Czech Republic.

CMCC, "Transmission switching time between SUL carrier and NR TDD carrier", 3GPP TSG RAN WG1 Meeting 90bis, R1-1718694, Prague, CZ, Oct. 9-13, 2017, 2 pages.

Huawei et al., "Proposal of frequency ranges for LTE-NR coexistence with UL sharing", 3GPP TSG RAN4 meeting #82bis, R4-1704411, Spokane, USA, Apr. 3-7, 2017, total 3 pages.

* cited by examiner

CARRIER SWITCHING METHOD, APPARATUS, AND SYSTEM FOR MULTI-CARRIER COMMUNICATION

CROSS-REFERENCE TO RELATED APPLICATIONS

This application is a continuation of U.S. patent application Ser. No. 16/874,761, filed on May 15, 2020, which is a continuation of International Application No. PCT/CN2018/116032, filed on Nov. 16, 2018. The International Application claims priority to Chinese Patent Application No. 201711148290.4, filed on Nov. 17, 2017. All of the aforementioned patent applications are hereby incorporated by reference in their entireties.

TECHNICAL FIELD

This application relates to the field of communications technologies, and in particular, to a multi-carrier communications technology in a wireless communications system.

BACKGROUND

A sounding reference signal (SRS) is introduced into a long term evolution (LTE) system. For example, the SRS may be used to determine uplink channel quality. In multi-carrier communication, for example, in a carrier aggregation (CA) scenario, a network device (for example, a base station) configures N component carriers (CC) for a terminal (for example, user equipment (UE)), and the UE may support simultaneous transmission of only M (M<N) uplink carriers due to an insufficient uplink capability. Therefore, to obtain downlink channel statuses of N–M time division duplex (TDD) carriers of the UE, the SRS is transmitted on the N–M TDD carriers in LTE Rel-14. In other words, SRS carrier switching is supported. The UE may switch from one of the M uplink carriers (which may be referred to as a switching-from uplink carrier (switching-from UL CC)) to a TDD carrier of the N–M carriers (which may be referred to as a switching-to uplink carrier (switching-to UL CC)) to send the SRS.

To make full use of an uplink resource of the LTE system, uplink resource sharing is discussed, and a shared uplink resource may be considered as a supplementary uplink (SUL) resource.

SUMMARY

Embodiments of this application provide a wireless communication method, a wireless communications apparatus, and a wireless communications system, to specify a switching-from uplink carrier for an SRS carrier switching and a switching-to uplink carrier for the SRS carrier switching for a cell including an SUL carrier, thereby improving reliability of SRS transmission.

According to a first aspect, an embodiment of this application provides a wireless communication method and a wireless communications apparatus. The communications apparatus may be, for example, an integrated circuit, a terminal, a wireless device, or a circuit module. The communications apparatus receives configuration information that includes first uplink carrier information and second uplink carrier information, and determines an SRS switching-from uplink carrier and an SRS switching-to uplink carrier based on the configuration information. The first uplink carrier information indicates that a first uplink carrier is the switching-from uplink carrier for the SRS carrier switching. The second uplink carrier information indicates that a second uplink carrier is the switching-to uplink carrier for the SRS carrier switching.

In solutions of this application, an uplink carrier in a cell including an SUL carrier (sometimes referred to as an SUL cell) is used as the switching-from uplink carrier (switching-from UL CC) for an SRS carrier switching. The communications apparatus may determine whether to use a resource (for example, an RF capability) of the SUL or a resource (for example, an RF capability) of a non-SUL (sometimes also referred to as a primary uplink (PUL)). When the SUL cell is used as the switching-to uplink carrier (switching-to UL CC) for the SRS carrier switching, the communications apparatus may determine whether to switch to the SUL carrier or the non-SUL carrier to transmit an SRS, thereby ensuring reliability of SRS transmission.

Optionally, the communications apparatus is configured to receive DCI that carries aperiodic A-SRS trigger indication information and uplink carrier identifier information, and the A-SRS trigger indication information is used to indicate a specific uplink carrier on which an A-SRS is triggered.

Optionally, an A-SRS switching-to uplink carrier is determined based on the second uplink carrier information, the A-SRS trigger indication information, and the uplink carrier identifier information. In a special SRS scenario, the communications apparatus may also determine the SRS switching-from uplink carrier and the SRS switching-to uplink carrier. Therefore, the communications apparatus can be applied to more scenarios.

The communications apparatus may include a corresponding module or means configured to execute the foregoing method design, and the module or the means may be software and/or hardware.

In a design, the communications apparatus according to the first aspect includes a receiving module and a determining module. The receiving module is configured to receive the configuration information. The configuration information includes the first uplink carrier information and the second uplink carrier information. The first uplink carrier information is used to indicate that the first uplink carrier is the switching-from uplink carrier for the SRS carrier switching, and the second uplink carrier information is used to indicate that the second uplink carrier is the switching-to uplink carrier for the SRS carrier switching. At least one of the first uplink carrier and the second uplink carrier belongs to the cell including a supplementary uplink SUL carrier. The determining module is configured to determine the SRS switching-from uplink carrier and the SRS switching-to uplink carrier based on the first uplink carrier information and the second uplink carrier information in the configuration information.

Optionally, the receiving module is further configured to receive the downlink control information DCI. The DCI carries the aperiodic sounding reference signal A-SRS trigger indication information and the uplink carrier identifier. The uplink carrier identifier is used to indicate the second uplink carrier.

Optionally, that the determining module determines the SRS switching-to uplink carrier based on the configuration information includes that the determining module determines the SRS switching-to uplink carrier based on the second uplink carrier information, the A-SRS trigger indication information, and the uplink carrier identifier information.

According to a second aspect, an embodiment of this application provides a wireless communication method and a wireless communications apparatus. The communications apparatus may be, for example, an integrated circuit, a network device (for example, a base station), a wireless device, or a circuit module. A communications apparatus sends SRS configuration information that includes first uplink carrier information and second uplink carrier information. The configuration information includes the first uplink carrier information and the second uplink carrier information. The first uplink carrier information is used to indicate that a first uplink carrier is a switching-from uplink carrier for an SRS carrier switching, and the second uplink carrier information is used to indicate that a second uplink carrier is a switching-to uplink carrier for the SRS carrier switching. At least one of the first uplink carrier and the second uplink carrier belongs to a cell including a supplementary uplink (SUL) carrier.

Optionally, the communications device is further configured to send downlink control information (DCI). The DCI carries aperiodic sounding reference signal A-SRS trigger indication information and an uplink carrier identifier. The uplink carrier identifier is used to indicate the second uplink carrier.

The communications apparatus may include a corresponding module or means configured to execute the foregoing method design, and the module or the means may be software and/or hardware.

In a design, the communications apparatus according to the second aspect includes a sending module. The sending module is configured to send the configuration information of the SRS. The configuration information includes the first uplink carrier information and the second uplink carrier information.

The first uplink carrier information is used to indicate that the first uplink carrier is the switching-from uplink carrier for the SRS carrier switching, and the second uplink carrier information is used to indicate that the second uplink carrier is the switching-to uplink carrier for the SRS carrier switching. The at least one of the first uplink carrier and the second uplink carrier belongs to the cell including the supplementary uplink (SUL) carrier.

Optionally, the sending module is further configured to send the downlink control information DCI. The DCI carries the aperiodic sounding reference signal A-SRS trigger indication information and the uplink carrier identifier. The uplink carrier identifier is used to indicate the second uplink carrier.

Optionally, the communications apparatus may further include a receiving module, configured to receive uplink information sent by a terminal.

Optionally, in the foregoing aspects, at least one of the first uplink carrier information and the second uplink carrier information includes a cell identifier and the uplink carrier identifier. The SUL cell includes a plurality of uplink carriers (for example, two uplink carriers), and both the cell identifier and the uplink carrier identifier are added into the first uplink carrier information and/or the second uplink carrier information. Therefore, it can be determined that which uplink carrier in a cell is the SRS switching-from uplink carrier and/or the SRS switching-to uplink carrier.

Optionally, in the foregoing aspects, if a cell to which the second uplink carrier belongs is the cell including the SUL, the second uplink carrier is a non-SUL (sometimes also referred to as a primary uplink primary uplink, a secondary uplink, or the like) carrier. For an SUL cell that includes a TDD carrier and an SUL carrier, the SUL carrier and a downlink carrier of the TDD carrier are at different frequencies, and do not have channel reciprocity. For an SUL cell in which there is no physical uplink shared channel (PUSCH)/physical uplink control channel (PUCCH) transmission, a downlink channel condition of the SUL cell cannot be obtained by using the SRS configured on an SUL carrier. Therefore, when neither of two UL CCs of the SUL cell is configured with a PUSCH/PUCCH, it may be predefined that the switching-to UL CC is the non-SUL carrier (for example, by using a protocol agreement, through pre-configuration, or in another manner), to obtain the downlink channel condition of the SUL cell by using the configured SRS.

Optionally, in the foregoing aspects, if a serving cell to which the first uplink carrier belongs is the cell including the SUL, the first uplink carrier is a non-PUCCH carrier (sometimes also referred to as a PUCCH-less carrier), to avoid an impact on the PUCCH.

Optionally, in the foregoing aspects, the at least one of the first uplink carrier information and the second uplink carrier information is a new carrier indicator field NCIF identifier, and the NCIF identifier is used to indicate the first uplink carrier and/or the second uplink carrier. There are various manners for configuring the NCIF identifier. In an SUL cell scenario, the SRS switching-from uplink carrier and the SRS switching-to uplink carrier may be flexibly indicated.

Optionally, in the foregoing aspects, the NCIF identifier includes a cell identifier and the uplink carrier identifier. The NCIF identifier includes not only the cell identifier but also the uplink carrier identifier. Therefore, the SRS switching-from uplink carrier and/or the SRS switching-to uplink carrier are/is specifically determined in a cell based on an NCIF identifier.

Optionally, in the foregoing aspects, the configuration information is further used to indicate a location of an uplink carrier in an information block of UE-group-level DCI, the uplink carrier is not used to transmit a PUSCH/PUCCH (for example, a non-PUSCH/PUCCH carrier, or a PUSCH/PUCCH-less carrier), and the information block of the UE-group-level DCI includes at least one of SRS power control information, A-SRS trigger indication information, and uplink carrier identifier information of the uplink carrier that is not used to transmit the PUSCH/PUCCH. The configuration information only needs to indicate the location of the uplink carrier in the information block of the UE-group-level DCI, where the uplink carrier is not used to transmit the PUSCH/PUCCH. In this case, UE may determine, based on information in the information block, the switching-from uplink carrier for the SRS carrier switching and/or the switching-to uplink carrier for the SRS carrier switching, thereby reducing overheads for the configuration information.

Optionally, in the foregoing aspects, the configuration information further includes an index of a set to which the uplink carrier that is not used to transmit the PUSCH/PUCCH belongs and an index of a carrier in the set. When there are a large quantity of uplink carriers that are not used to transmit the PUSCH/PUCCH, the uplink carriers that are not used to transmit the PUSCH/PUCCH may be grouped, and the index of the set and the index of the carrier in the set are configured in the configuration information, so that the UE can quickly determine, based on the set index and the carrier index in the set, the SRS switching-from uplink carrier and/or the SRS switching-to uplink carrier.

According to a third aspect, an embodiment of this application provides a communications apparatus. The communications apparatus includes a processor and instruction(s) that is/are stored in a memory and that may run on the processor. When the processor executes the instructions, the communications apparatus implements the method in any one of embodiments of the first aspect or the second aspect. Optionally, the communications apparatus may include a transceiver unit.

According to a fourth aspect, this application provides a computer storage medium, including instruction(s). When the instructions run on a computer, the computer performs the method in any one of embodiments of the first aspect or the second aspect.

According to a fifth aspect, this application provides a computer program product. When the product runs on a computer, the computer performs the methods in the foregoing aspects.

DETAILED DESCRIPTION OF ILLUSTRATIVE EMBODIMENTS

The following describes the embodiments of this application with reference to accompanying drawings in the embodiments of this application.

Technologies described in this application may be used in various wireless communications networks, such as a code division multiple access (CDMA) network, a time division multiple access (TDMA) network, a frequency division multiple access (FDMA) network, an orthogonal frequency division multiple access (OFDMA) network, a single-carrier frequency division multiple access (SC-FDMA) network, and another network. Radio technologies such as universal terrestrial radio access (UTRA) and CDMA2000 can be implemented in the CDMA network. The UTRA includes wideband code division multiple access (WCDMA), the CDMA, and another variation. Radio technologies such as global system for mobile communications (GSM) can be implemented in the TDMA network. Radio technologies such as evolved UTRA (E-UTRA), ultra mobile broadband (UMB), IEEE 802.11 (WiFi), IEEE 802.16 (WiMAX), and IEEE 802.20 can be implemented in the OFDMA network. The E-UTRA may include a plurality of versions, such as LTE and LTE-A. This application may be further applied to a 5G network, a subsequent evolved network, or convergence of various networks.

Figure 1:
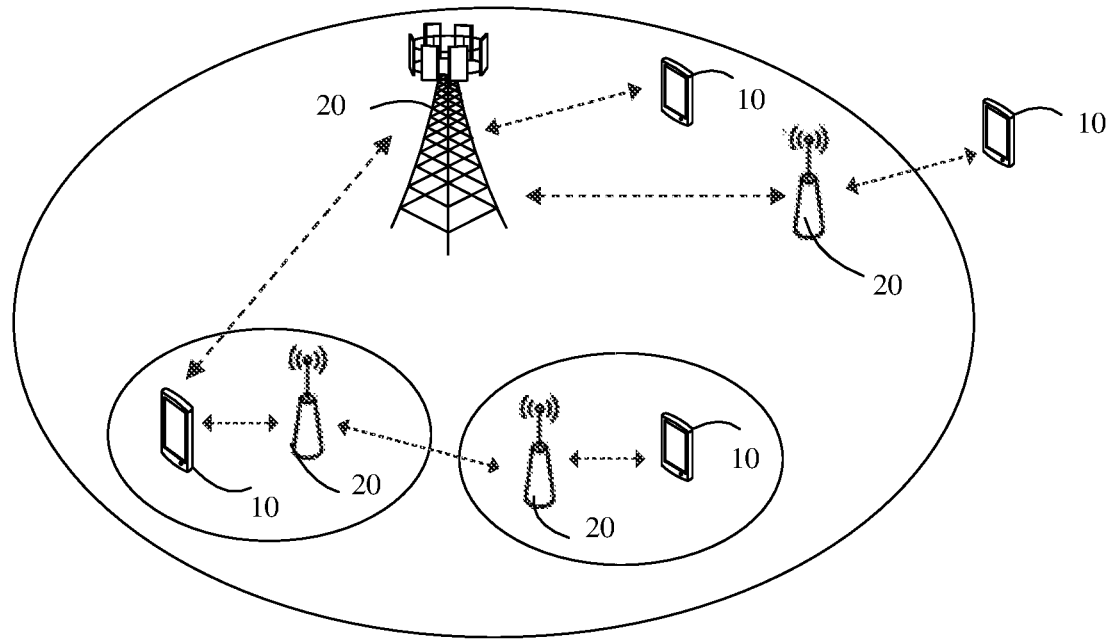
FIG. 1 is a schematic diagram of a possible radio access network according to an embodiment of this application.

FIG. 1 is a schematic diagram of a possible radio access network (RAN) according to an embodiment of this application. The RAN includes one or more network devices 20. The radio access network may be connected to a core network (CN). The network device 20 may be any device with wireless sending and receiving functions. The network device 20 includes but is not limited to a base station (for example, base station BS, NodeB, an evolved NodeB, eNodeB or eNB, gNodeB or gNB in the 5th generation 5G communications system, a base station in a future communications system, or an access node, a wireless relay node, or a wireless backhaul node in a Wi-Fi system), and the like. The base station may be a macro base station, a micro base station, a femto base station, a small cell, a relay station, or the like. A plurality of base stations can support networks in which a same technology mentioned above is used, or may support networks in which different technologies mentioned above are used. The base station may include one or more co-site or non-co-site transmission reception points (TRP). The network device 20 may alternatively be a radio controller, a centralized unit (CU), or a distributed unit (DU) in a cloud radio access network (CRAN) scenario. The network device 20 may alternatively be a server, a wearable device, a vehicle-mounted device, or the like. That the network device 20 is a base station is used as an example for description in the following. The plurality of network devices 20 may be base stations of a same type or base stations of different types. The base station may communicate with a terminal 10, or may communicate with the terminal 10 by using a relay station. The terminal 10 may communicate with a plurality of base stations using different technologies. For example, the terminal may communicate with a base station supporting an LTE network, may communicate with a base station supporting a 5G network, or may support a dual connection between a base station in an LTE network and a base station in a 5G network.

The terminal 10 is a device with wireless sending and receiving functions. The terminal 10 may be deployed on land and includes an indoor or outdoor device, a hand-held device, a wearable device, or a vehicle-mounted device; may be deployed on a water surface (for example, a ship); or may be deployed in the air (for example, an airplane, a balloon, or a satellite). The terminal device may be a mobile phone, a tablet computer (Pad), a computer having wireless sending and receiving functions, a virtual reality (VR) terminal device, an augmented reality (AR) terminal device, a wireless terminal related to industrial control, a wireless terminal related to self driving, a wireless terminal related to telemedicine, a wireless terminal related to a smart grid, a wireless terminal related to transportation safety, a wireless terminal related to a smart city, a wireless terminal related to a smart home, or the like. An application scenario is not limited in the embodiments of this application. Sometimes, the terminal may also be referred to as a terminal device, user equipment (UE), an access terminal device, a UE unit, a UE station, a mobile site, a mobile station, a remote station, a remote terminal device, a mobile device, a UE terminal device, a wireless communications device, a UE agent, a UE apparatus, or the like. The terminal may alternatively be fixed or mobile.

Figure 2:
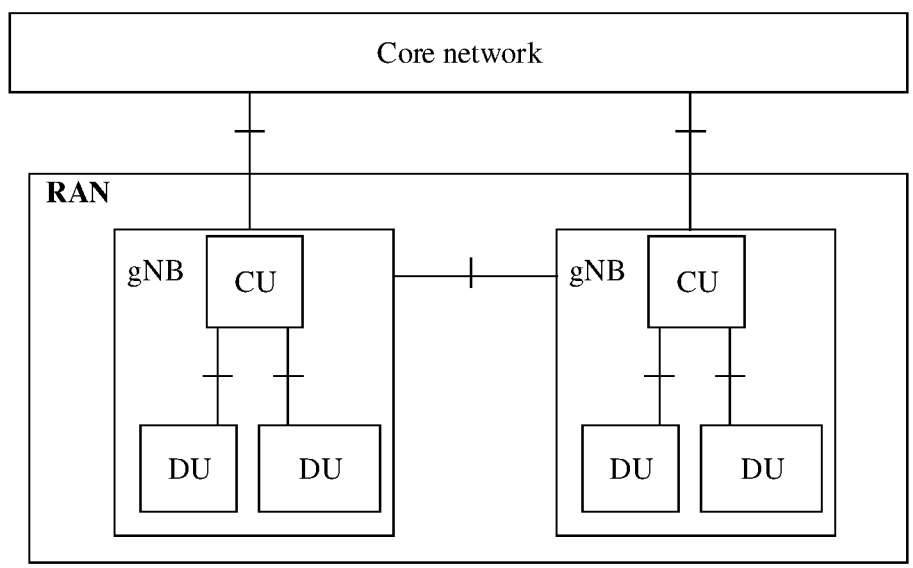
FIG. 2 is a schematic diagram of an architecture example of a communications system.

FIG. 2 is a schematic diagram of an architecture example of a communications system. As shown in FIG. 2, a network device in a radio access network RAN is a base station (for example, a gNB) with a CU/DU split architecture. The RAN may be connected to a core network (for example, an LTE core network or a 5G core network). A CU and a DU may be understood as division of a base station from a logical function perspective. The CU and the DU can be physically separated or physically deployed together. A function of the RAN is ended up on the CU. A plurality of DUs can share one CU. One DU may also be connected to a plurality of CUs (not shown in the figure). The CU and the DU may be connected by using an interface, for example, an F1 interface. The CU and the DU may be obtained through division based on protocol layers of a wireless network. For example, functions of a packet data convergence protocol (PDCP) layer and a radio resource control (RRC) layer are set in the CU, and functions of a radio link control (RLC) layer, a media access control (MAC) layer, a physical layer, and the like are set in the DU. It may be understood that, that processing functions of the CU and the DU are divided based on these protocol layers is merely an example, and the processing functions may alternatively be divided in another manner. For example, functions of more protocol layers may be distributed to the CU or the DU. For example, some processing functions of the protocol layers may be further distributed to the CU or the DU. In a design, some functions of the RLC layer and functions of a protocol layer above the RLC layer are set in the CU, and remaining functions of the RLC layer and functions of a protocol layer below the RLC layer are set in the DU. In another design, functions of the CU or the DU may alternatively be divided based on a service type or another system requirement. For example, division is performed based on a delay, a function whose processing time needs to meet a delay requirement is set in the DU, and a function whose processing time does not need to meet the delay requirement is set in the CU. The network architecture shown in FIG. 2 may be applied to a 5G communications system, and the network architecture may alternatively share one or more components or resources with an LTE system. In another design, the CU may alternatively have one or more functions of the core network. One or more CUs may be set in a centralized manner or a separated manner. For example, the CU may be set on a network side for centralized management; and the DU may have a plurality of radio frequency functions, or a radio frequency function may be remotely set.

The function of the CU may be implemented by one entity. Alternatively, a control plane (CP) and a user plane (UP) may be further separated. To be specific, the control plane of the CU (CU-CP) and the user plane of the CU (CU-UP) may be implemented by different functional entities, and the CU-CP and the CU-UP may be coupled to the DU to jointly implement a function of the base station.

In this application, nouns "network" and "system" are usually interchangeably used, and an "apparatus" and a "device" are also usually interchangeably used. However, meanings of the nouns can be understood by a person skilled in the art. A "communications apparatus" may be the network device (for example, the base station, the DU, or the CU) or the terminal in FIG. 1 and FIG. 2, or a component (for example, an integrated circuit or a chip) of the network device or the terminal, or another communications module.

Figure 3:
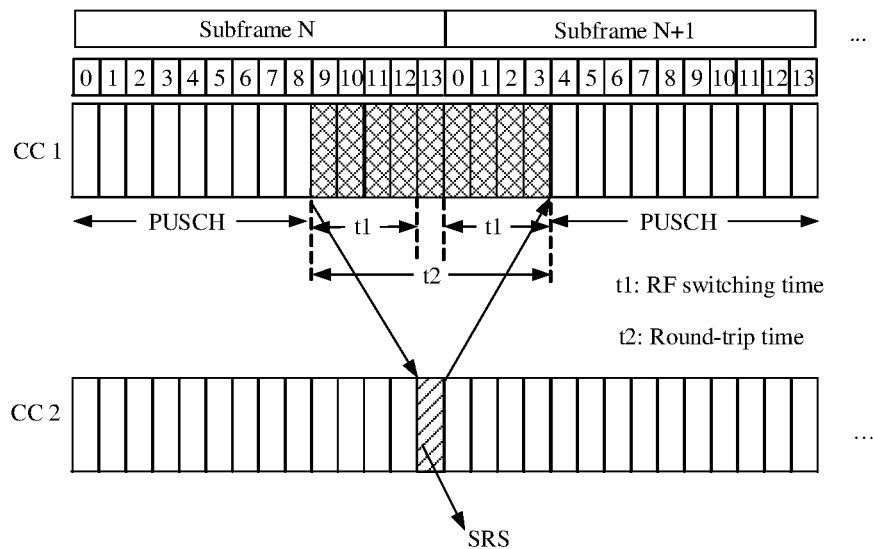
FIG. 3 is a schematic diagram of an SRS carrier switching solution.

FIG. 3 is a schematic diagram of an SRS carrier switching solution. As shown in FIG. 3, two orthogonal frequency division multiplexing (OFDM) symbols are required for a UE RF, a CC 2 is a switching-to UL CC, and a CC 1 is a switching-from UL CC. When UE switches from the CC 1 to the CC 2 to send an SRS, the UE cannot send a physical uplink shared channel (PUSCH) on symbols 11 to 13 in a subframe N and symbols 0 and 1 in a subframe N+1, where these symbols correspond to the CC 1.

For ease of description, terms in an LTE system are used as examples in this application. It may be understood that other terms may also be used in other systems. The following describes some terms in this application, to facilitate understanding of a person skilled in the art.

A cell may refer to a coverage area of a base station and/or a base station subsystem serving the coverage area. For example, a coverage area of an eNB may be a macro cell, a micro cell, a pico cell, or a cell of another type. The macro cell may cover a relatively large geographical area, and the micro cell may cover a relatively small geographical area, or the like. The base station can support one or more cells. For a terminal, a cell serving the terminal may include one downlink carrier and one uplink carrier (for example, the LTE network). After an SUL resource is introduced, the cell serving the terminal may alternatively include one downlink carrier and a plurality of uplink carriers. For example, in 5G communication, a cell may include one downlink carrier and two uplink carriers.

The SUL resource indicates that only an uplink resource is used for transmission in a current communications standard. For example, for a carrier, only an uplink resource is used for transmission. For example, in the 5th generation (5G) mobile communications system also referred to as an NR communications system, a carrier A is used for only NR uplink transmission and is not used for downlink transmission. Alternatively, the carrier A is used for uplink transmission in an LTE communications system and is not used for downlink transmission in NR. In this case, the carrier A is the SUL resource.

An SUL cell is sometimes referred to as a cell including an SUL, and refers to a cell including the SUL resource.

A carrier is a radio wave at a specific frequency and is an electromagnetic wave that can be modulated in aspects such as a frequency, amplitude modulation, or a phase to transmit language, music, an image, or another signal.

The uplink resource may be understood as a carrier (including a carrier in a non-CA scenario and a carrier in a CA scenario). In other words, the uplink resource may be a part that is of the carrier and that is used for uplink transmission. Alternatively, the uplink resource may also be understood as a part that is of a cell (including a cell in a CA scenario and a cell in a non-CA scenario) and that is used for uplink transmission. In other words, the uplink resource may be a part that is of the cell and that is used for uplink transmission. The CC in the CA scenario may be a primary CC or a secondary CC, and the cell in the CA scenario may be a primary cell (PCell) or a secondary cell (SCell). The uplink resource may alternatively be referred to as the uplink carrier. Correspondingly, a part that is of the carrier or the cell and that is used for the downlink transmission may be understood as a downlink resource or a downlink carrier. For example, in an FDD system, a frequency resource used for uplink transmission on a carrier may be understood as the uplink resource or the uplink carrier, and a frequency resource used for downlink transmission on a carrier may be understood as the downlink resource or the downlink carrier. For another example, in a TDD system, a time domain resource used for uplink transmission on a carrier may be understood as the uplink resource or the uplink carrier, and a time domain resource used for downlink transmission on a carrier may be understood as the downlink resource or the downlink carrier.

Figure 4:
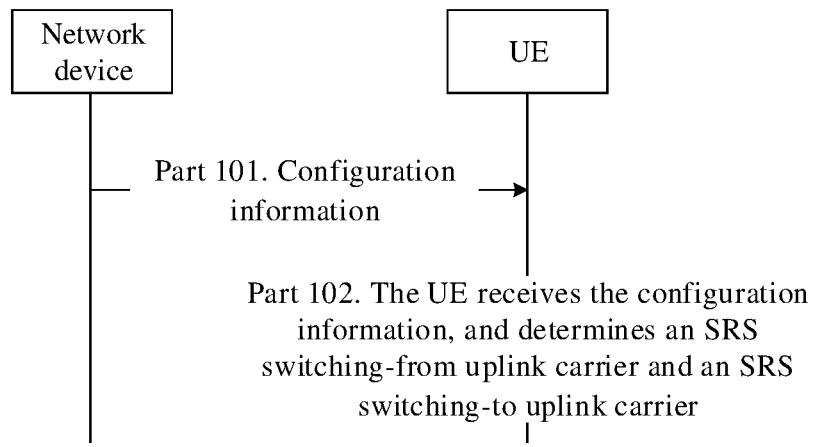
FIG. 4 is a flowchart of a wireless communication method according to an embodiment of this application.

FIG. 4 is a flowchart of a wireless communication method according to an embodiment of this application. The method may be applied to the networks shown in FIG. 1 and FIG. 2.

Part 101. A network device sends configuration information to UE.

The configuration information includes information about at least two uplink carriers. For example, the configuration information includes first uplink carrier information and second uplink carrier information. The first uplink carrier information is used to indicate that a first uplink carrier is a switching-from uplink carrier for an SRS carrier switching, and the second uplink carrier information is used to indicate that a second uplink carrier is a switching-to uplink carrier for the SRS carrier switching. At least one of the first uplink carrier and the second uplink carrier belongs to a cell including an SUL resource.

Optionally, the configuration information further includes configuration information of an SRS of the UE on the second uplink carrier, and is used to configure time domain information, frequency domain information, and code domain information for UE SRS transmission.

The configuration information may be dedicated instruction information, or may be carried in radio resource control (RRC) information (for example, RRC connection setup signaling, RRC connection reestablishment signaling, or RRC connection reconfiguration signaling) or downlink control information (DCI).

Figure 5:
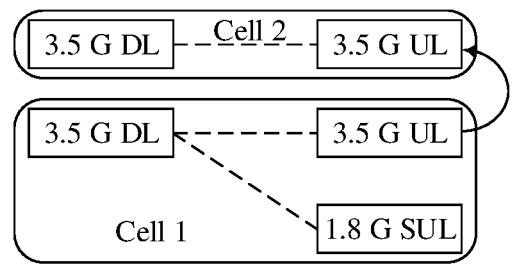
FIG. 5 to FIG. 9 are schematic diagrams of an SRS carrier switching solution.
Figure 6:
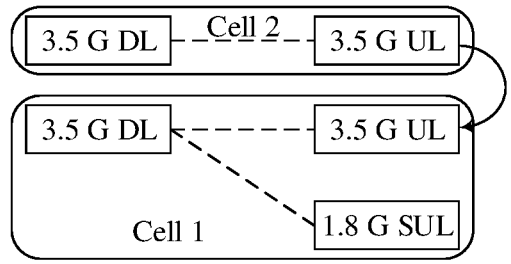

A cell to which the SRS switching-from uplink carrier belongs is a switching-from cell, and a cell to which the SRS switching-to uplink carrier belongs is a switching-to cell. As shown in FIG. 5, a cell 1 is an SUL cell, and the cell 1 includes a 1.8 G SUL carrier and a 3.5 G uplink (UL) carrier. If the cell 1 is a switching-from cell, and the 3.5 G UL carrier is an SRS switching-from uplink carrier, the first uplink carrier information may include information used to indicate cell 1 and the 3.5 G UL carrier. In other words, the first uplink carrier information includes information used to indicate a switching-from cell and information used to indicate a switching-from carrier. Similarly, as shown in FIG. 6, if a cell 1 is a switching-to cell, and a 3.5 G UL carrier is an SRS switching-to uplink carrier, the second uplink carrier information may include information used to indicate cell 1 and the 3.5 G UL carrier. In other words, the second uplink carrier information includes information used to indicate the switching-to cell and information used to indicate the switching-to carrier.

Optionally, at least one of the first uplink carrier information and the second uplink carrier information includes a cell identifier and an uplink carrier identifier. The cell identifier is used to identify a cell, for example, a cell index, a secondary cell index (SCellIndex), or other information that may be used to identify a cell. The uplink carrier identifier is used to identify a carrier, for example, a component carrier index (CC index), an uplink index (UL index), a secondary cell SUL index (SCellSULIndex), or other information that can be used to identify a carrier. Herein, SCellSULIndex is an identifier of an uplink carrier. Representation manners and names of the cell identifier and the uplink carrier identifier are not limited in this application. For example, in the example shown in FIG. 5, the information used to indicate the switching-from cell may be the cell identifier, for example, the cell index or the secondary cell index. Two uplink carriers, one UL carrier, and one SUL carrier are in a switching-from cell 1. The information identifying the switching-from carrier may be a carrier identifier, to indicate whether the switching-from carrier is the 1.8 G SUL carrier or the 3.5 G UL carrier. In another example, the carrier identifier may indicate whether the switching-from carrier is the UL carrier or the SUL carrier. If it is indicated that the switching-from carrier is the UL carrier, it may be learned that the switching-from carrier is the 3.5 G UL carrier. If the switching-from carrier is the SUL carrier, it may be learned that the switching-from carrier is the 1.8 G SUL carrier. This is similar to the example in FIG. 6, and details are not described again.

In the following description, these different expressions are sometimes interchangeably used, and are used to indicate the cell identifier or the uplink carrier identifier.

The cell identifier and the uplink carrier identifier may be used to indicate the SRS switching-from uplink carrier and/or the SRS switching-to uplink carrier.

In the example shown in FIG. 5, the cell 1 is a switching-from cell, and cell 1 includes two uplink carriers: a 1.8 G SUL carrier and a 3.5 G UL carrier. The 3.5 G UL carrier is an SRS switching-from uplink carrier. The first uplink carrier information includes an identifier of cell 1 and an identifier of the 3.5 G UL carrier. For example, two information element: SCellIndex and SCellSULIndex may be used in the first uplink carrier information to indicate the SRS switching-from uplink carrier for an SRS carrier switching. Cell 2 is a switching-to cell, and cell 2 includes a 3.5 G UL carrier. The second uplink carrier information may include an identifier of cell 2. For example, SCellIndex may be used in the second uplink carrier information to indicate the SRS switching-to uplink carrier for the SRS carrier switching.

In the example shown in FIG. 6, cell 1 is a switching-to cell, and cell 1 includes two uplink carriers: a 1.8 G SUL carrier and the 3.5 G UL carrier. The 3.5 G UL carrier is an SRS switching-to uplink carrier for an SRS carrier switching. The second uplink carrier information includes an identifier of cell 1 and an identifier of the 3.5 G UL carrier. For example, two information elements: SCellIndex and SCellSULIndex may be comprised in the second uplink carrier information to indicate the SRS switching-to uplink carrier. A cell 2 is the switching-from cell, and cell 2 includes a 3.5 G UL carrier. Therefore, the first uplink carrier information may include an identifier of the cell 2. For example, SCellIndex may be used in the first uplink carrier information to indicate the SRS switching-from uplink carrier.

Figure 7:
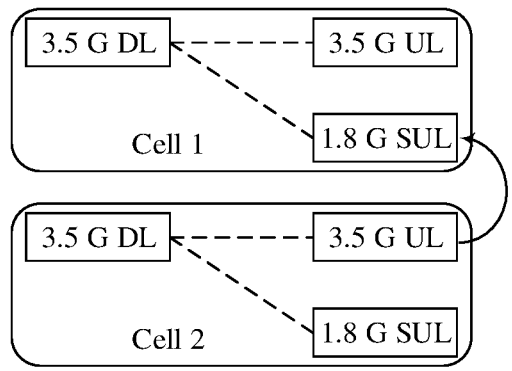

In an example shown in FIG. 7, cell 2 is the switching-from cell, and cell 2 includes two uplink carriers: a 1.8 G SUL carrier and a 3.5 G UL carrier. The 3.5 G UL carrier is the SRS switching-from uplink carrier for the SRS carrier switching. Therefore, the first uplink carrier information includes an identifier of cell 2 and an identifier of the 3.5 G UL carrier. For example, two information elements: SCellIndex and SCellSULIndex may be comprised in the first uplink carrier information to indicate the SRS switching-from uplink carrier. Similarly, cell 1 is a switching-to carrier, and cell 1 includes two uplink carriers: a 1.8 G SUL carrier and a 3.5 G UL carrier. The 1.8 G SUL carrier is an SRS switching-to uplink carrier for the SRS carrier switching. Therefore, the second uplink carrier information includes an identifier of cell 1 and an identifier of the 1.8 G SUL carrier. For example, two information elements: SCellIndex and SCellSULIndex may be used in the second uplink carrier information to indicate the SRS switching-to uplink carrier.

For example, as shown in Code 1, if the switching-from UL CC indicated by an SCellIndex belongs to an SUL cell, an SCellSULIndex field needs to be additionally used to indicate the switching-from UL CC. If the switching-to UL CC is an SUL cell, and an SRS needs to be transmitted on an SUL carrier and a non-SUL carrier, two switching-from UL CCs need to be configured.

Optionally, the second uplink carrier information of the second uplink carrier may implicitly indicate the SRS switching-to uplink carrier by using SCellIndex and resource configuration. For example, in the pseudocode 1, information elements: SCellIndex and radioResourceConfigDedicatedSCell jointly indicate that the second uplink carrier is the 3.5 G UL carrier, and radioResourceConfigDedicatedSCell includes SRS configuration information and some other UE-level configuration information on the 3.5 G UL carrier. The information elements SCellIndex and SULradioResourceConfigDedicatedSCell jointly indicate that the second uplink carrier is the 1.8 G SUL carrier, and SULradioResourceConfigDedicatedSCell includes SRS configuration information and some other UE-level configuration information on the 1.8 G SUL.

carrier is a non-PUCCH carrier. In other words, no uplink carrier for the PUCCH transmission is configured in the cell including the SUL carrier.

In LTE Rel-14, the first uplink carrier is defined as an uplink carrier that is in a TDD serving cell and that is not configured for the PUSCH/PUCCH transmission.

In this embodiment, the non-PUCCH carrier in the cell including the SUL carrier is predefined (for example, by using a protocol specification, through pre-negotiation, or through pre-configuration) as the first uplink carrier. In other words, the non-PUCCH carrier in the cell including the SUL

```
                               Code 1:

SCellToAddMod-r10 ::=              SEQUENCE {
    sCellIndex-r10                     SCellIndex-r10, //switch-to CC
    cellIdentification-r10             SEQUENCE {
                    physCellId-r10         PhysCellId,
                    dl-CarrierFreq-r10     ARFCN-ValueEUTRA
    }
OPTIONAL,              -- Cond SCellAdd
    radioResourceConfigCommonSCell-r10
RadioResourceConfigCommonSCell-r10     OPTIONAL,    -- Cond SCellAdd
    radioResourceConfigDedicatedSCell-r10   RadioResourceConfigDedicatedSCell-
OPTIONAL,              -- Cond SCellAdd2
    ...,
    [[              dl-CarrierFreq-v1090        ARFCN-ValueEUTRA-v9e0
OPTIONAL              -- Cond EARFCN-max
    ]],
    [[              antennaInfoDedicatedSCell-v10i0   AntennaInfoDedicated-v10i0
OPTIONAL              -- Need ON
    ]],
    [[              srs-SwitchFromServCellIndex-r14   INTEGER (0.. 15) OPTIONAL
-- Need ON //switch-from CC
                    SCellSULIndex
SCellSULIndex(1bit(0,1)/2bit(0,1,2,3)) optional //UL__CC__index     ]]
    SULradioResourceConfigCommonSCell-r10
RadioResourceConfigCommonSCell-r10     OPTIONAL,    -- Cond SCellAdd
    SULradioResourceConfigDedicatedSCell-r10
RadioResourceConfigDedicatedSCell-r10  OPTIONAL,    -- Cond SCellAdd2
    [[              srs-SwitchFromServCellIndex-r14   INTEGER (0.. 15) OPTIONAL
-- Need ON   //switch-from CC
                    SCellSULIndex
SCellSULIndex(1bit(0,1)/2bit(0,1,2,3)) optional //UL__CC__index
    ]]
}
```

Optionally, if a cell to which the second uplink carrier belongs is a cell including an SUL, the second uplink carrier is a non-SUL carrier.

The non-SUL carrier is an uplink carrier in a 5G system, for example, an NR dedicated UL carrier.

In this embodiment, the non-SUL carrier in the cell including the SUL may be defined as the second uplink carrier in a predefined manner of a protocol. In other words, the non-SUL carrier in the cell including the SUL is the SRS switching-to uplink carrier by default. For example, if an SCell is the SUL cell, the SCell includes a TDD carrier and an SUL carrier, and downlink carriers of the SUL carrier and the TDD carrier are at different frequencies, and do not have channel reciprocity. For an SUL cell in which there is no PUSCH/physical uplink control channel (PUCCH) transmission, a downlink channel condition of the SUL cell cannot be obtained by using an SRS configured on the SUL carrier. Therefore, when neither of two UL CCs of the SUL cell is configured with a PUSCH/PUCCH, it may be predefined in the protocol that the switching-to UL CC is a non-SUL carrier, for example, the 3.5 G UL carrier in cell 1 in FIG. 6.

Optionally, if a serving cell to which the first uplink carrier belongs is the cell including the SUL, the first uplink carrier is the SRS switching-from uplink carrier by default. For example, if a cell to which the switching-from UL CC belongs is the SUL cell, because the SUL cell includes two uplink carriers, one uplink carrier (for example, the non-PUCCH carrier or a carrier for latest uplink transmission) in the SUL cell is predefined as the first uplink carrier.

Further, because a resource of the switching-from UL CC (for example, a UL RF capability) is required for an SRS on the switching-to UL CC, if the SUL cell is used as a primary cell, RRC signaling is configured with a PUCCH carrier. To avoid an impact on the PUCCH, it may be predefined that the switching-from UL CC is the non-PUCCH carrier (for example, by using a protocol agreement, through pre-configuration, or through pre-agreement), for example, the 3.5 G UL carrier in the cell 1 shown in FIG. 5. If the SUL cell is used as a secondary cell, it may be predefined in a protocol that the switching-from UL CC is an uplink carrier for latest PUSCH transmission.

For example, as shown in Code 2, because it is predefined that the non-PUCCH carrier in the cell including the SUL carrier is the first uplink carrier, a cell identifier (e.g. sCellIndex-r10) is configured in the configuration information.

```
Code 2:

SCellToAddMod-r10 ::=              SEQUENCE {
    sCellIndex-r10                 SCellIndex-r10,   (if SCell is a switching-to UL
CC)
    cellIdentification-r10         SEQUENCE {
                    physCellId-r10              PhysCellId,
                    dl-CarrierFreq-r10          RFCN-ValueEUTRA
    }
OPTIONAL,              -- Cond SCellAdd
    radioResourceConfigCommonSCell-r10
    RadioResourceConfigCommonSCell-r10     OPTIONAL,       -- Cond SCellAdd
    radioResourceConfigDedicatedSCell-r10    RadioResourceConfigDedicatedSCell-
r10 OPTIONAL,              -- CondSCellAdd2
    ...,
    [[                             dl-CarrierFreq-v1090        ARFCN-ValueEUTRA-v9e0
OPTIONAL               -- Cond EARFCN-max
    ]],
    [[                             antennaInfoDedicatedSCell-v10i0
    AntennaInfoDedicated-v10i0 OPTIONAL     -- Need ON
    ]],
    [[                             srs-SwitchFromServCellIndex-r14   INTEGER (0... 15) OPTIONAL
    -- Need ON (config a switching-from UL CC)
    ]]
}
```

Figure 8:
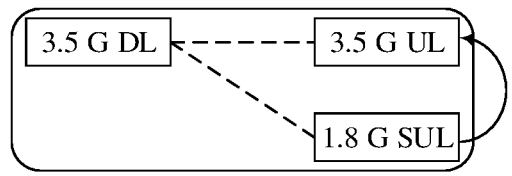

Optionally, if the UE is configured with one SUL cell, and the UE has only one set of uplink radio frequencies (UL RF), in other words, the UE is configured with an uplink carrier used for the PUSCH transmission, the switching-from UL CC is an uplink carrier configured with the PUSCH transmission. Therefore, no switching-from UL CC needs to be additionally specified in the configuration information. As shown in FIG. 8, a cell of the UE includes a 3.5 G UL carrier and a 1.8 G SUL carrier. If the 1.8 G SUL carrier is configured to transmit the PUSCH, the 1.8 G SUL carrier is the switching-from UL CC.

Optionally, the at least one of the first uplink carrier information and the second uplink carrier information is a new carrier indicator field (NCIF) identifier. It may be understood that the NCIF identifier is used to indicate the first uplink carrier and/or the second uplink carrier, and may also have other names, for example, a carrier indicator field CIF and a new radio carrier indicator field NR CIF. This is not limited in this application.

In this embodiment, the SUL cell may be configured with a plurality of NCIF identifiers, and each NCIF identifier corresponds to one 2-tuple (SCellIndex, ULCCindex). Herein, SCellIndex is a cell identifier, and ULCCindex is an uplink carrier identifier. The switching-to UL CC or the switching-from UL CC may be indicated by using the NCIF identifier, the NCIF identifier may be carried in an NCIF field of the DCI, and the NCIF field may be multiplexed with a carrier indicator field (CIF). A person skilled in the art may also set another identifier to indicate the first uplink carrier and/or the second uplink carrier, and the identifier is not limited to the NCIF identifier.

Figure 9:
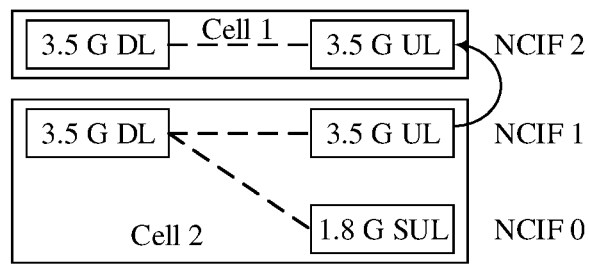

As shown in FIG. 9, an NCIF 0 indicates a 1.8 G SUL carrier in a cell 2, an NCIF 1 indicates a 3.5 G UL carrier in the cell 2, and an NCIF 2 indicates a 3.5 G UL carrier in a cell 1. When there is another cell and another uplink carrier, more NCIF identifiers may be set to identify different uplink carriers in different cells. As shown in Code 3, the NCIF identifiers may be used to indicate a corresponding switching-from UL CC and a corresponding switching-to UL CC.

```
Code 3:

SCellToAddMod-r10 ::=              SEQUENCE {
    sCellIndex-r10                 NCIF, //switch-to UL CC
    cellIdentification-r10         SEQUENCE {
                    physCellId-r10              PhysCellId,
                    dl-CarrierFreq-r10          ARFCN-ValueEUTRA
    }
    OPTIONAL,              -- Cond SCellAdd
        radioResourceConfigCommonSCell-r10
        RadioResourceConfigCommonSCell-r10     OPTIONAL,       -- Cond SCellAdd
            radioResourceConfigDedicatedSCell-r10    RadioResourceConfigDedicatedSCell-
    r10 OPTIONAL,              -- Cond SCellAdd2
        ...,
        [[                             dl-CarrierFreq-v1090        ARFCN-ValueEUTRA-v9e0
    OPTIONAL               --Cond EARFCN-max
        ]],
        [[                             antennaInfoDedicatedSCell-v10i0
        AntennaInfoDedicated-v10io OPTIONAL     -- Need ON
        ]],
        [[                             srs-SwitchFromServCellIndex-r14   NCIF OPTIONAL   -- Need
    ON //switch-from UL CC
        ]]
    }
```

Optionally, when UE-level PUSCH configuration information, UE-level PUCCH configuration information, and UE-level SRS configuration information are configured by using RRC signaling, the RRC signaling further includes the NCIF identifier.

For example, the RRC signaling may be, for example, RRC connection configuration (connectionsetup) signaling, the RRC connection reconfiguration (connectionreconfiguration) signaling, or the RRC connection reestablishment (connectionreestablishment) signaling. The RRC signaling may include at least one of radio resource configuration information (for example, RadiorResourceConfigDedicated) and SUL radio resource configuration information (for example, SULRadioResourceConfigDedicated). If the RRC signaling includes both the radio resource configuration information and the SUL radio resource configuration information, the radio resource configuration information is associated with at least one NCIF identifier (for example, NCIF 1), and the SUL radio resource configuration information is associated with at least one NCIF identifier (for example, NCIF 2). An association manner is not limited. For example, the identifier NCIF 1 and RadioResourceConfigDedicated may be two information elements in the RRC signaling, and the NCIF 1 may also be carried in RadioResourceConfigDedicated information. The identifier NCIF 2 and SULRadioResourceConfigDedicated may be two information elements in the RRC signaling, and the identifier NCIF 2 may also be carried in SUL RadioResourceConfigDedicated information.

The radio resource configuration information may include non-SUL configuration information (RadioResourceConfigULDedicated). Optionally, the radio resource configuration information may further include DL UE-level configuration information. The SUL radio resource configuration information may include SUL configuration information (RadioResourceConfigULDedicated), or may include other configuration information. In this application, names of messages and names of information elements are merely examples, and other names may also be used. This is not limited in this application.

As shown in Code 4, in RRCconnectionsetup signaling configuration, RadioResourceConfigDedicated is associated with the identifier NCIF 1, and SULRadioResourceConfigDedicated is associated with the identifier NCIF 2.

```
                                Code 4:

RRCConnectionSetup-r8-IEs ::=           SEQUENCE {
    sCellIndex                          NCIF₁               OPTIONAL
    radioResourceConfigDedicated            RadioResourceConfigDedicated,
    sCellIndex                          NCIF₂               OPTIONAL
    SULRadioResourceConfigDedicated RadioResourceConfigDedicated, OPTIONAL
    nonCriticalExtension                RRCConnectionSetup-v8a0-IEs   OPTIONAL
}
```

Optionally, as shown in Code 5, in radioresourceconfigdedicated configuration, physical configuration information (physicalconfigdedicated) may be associated with the identifier NCIF 1, and SUL physical configuration information (SULphysicalconfigdedicated) is associated with the identifier NCIF 2. An association manner is not limited. An NCIF identifier may be parallel with physicalconfigdedicated, or may be carried in physicalconfigdedicated. A specific manner of configuring the NCIF identifier is not limited by the foregoing examples. Optionally, physicalconfigdedicated may include non-SUL configuration information (physicalconfigULdedicated), and optionally, may further include non-SUL UE-level configuration information and DL UE-level configuration information. Herein, physicalSULconfigdedicated includes SUL configuration information. A specific name of an information element is not limited to the foregoing manner.

Herein, physicalconfigdedicated includes UE-level PUSCH configuration information, UE-level PUCCH configuration information, UE-level PDCCH configuration information, and UE-level SRS configuration information on the non-SUL carrier; and SULphysicalconfigdedicated includes UE-level PUSCH configuration information, UE-level SRS configuration information, and UE-level PUCCH configuration information on the SUL. Optionally, physicalconfigdedicated may include the non-SUL configuration information, and physicalconfigdedicated may be renamed as physicalconfigULdedicated. Optionally, physicalconfigdedicated may further include non-SUL UE-level configuration information and the DL UE-level configuration information. Herein, SULphysicalconfigULdedicated includes the SUL configuration information. A specific name of an information element is not limited to the foregoing manner.

| Code 5: |  |  |
|---|---|---|
| RadioResourceConfigDedicated::= | SEQUENCE { | |
| ..., | | |
| sCellIndex | $NCIF_1$ | OPTIONAL |
| physicalConfigDedicated | PhysicalConfigDedicated OPTIONAL, -- Need ON | |
| sCellIndex | $NCIF_2$ | OPTIONAL |
| SULphysicalConfigDedicated | PhysicalConfigDedicated OPTIONAL, -- Need ON | |
| dynamicScheduling | True/False | OPTIONAL |
| ..., | | |
| } | | |

Optionally, the NCIF identifier includes a cell identifier and/or an uplink carrier identifier. For example, when a serving cell is an SUL cell, the NCIF identifier is equivalent to a cell identifier and an uplink carrier identifier; or when the serving cell is a cell that includes only one uplink carrier and one downlink carrier, the NCIF identifier is equivalent to a cell identifier.

In this embodiment, the NCIF identifier may be an identifier generated based on the cell identifier and the uplink carrier identifier. For example, SCellIndex and SCellSULIndex may be used as the NCIF identifier. Alternatively, the NCIF identifier may be an identifier generated based on the cell identifier. It may be understood that another part may be added into an NCIF to form another structure. This does not affect functions of the NCIF in the solutions of this application.

It should be noted that a manner in which one SUL cell including a plurality of NCIF identifiers is configured by using RRC signaling is not limited to the foregoing examples.

Figure 10:
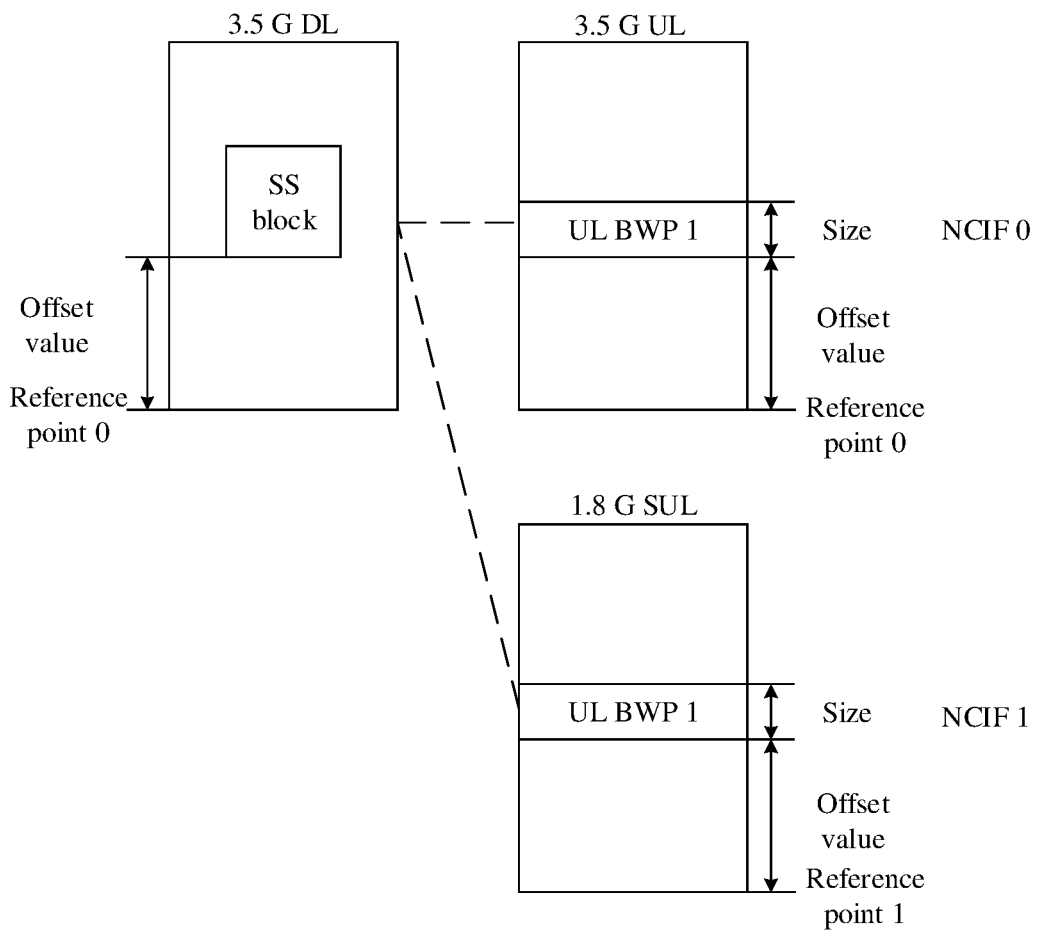
FIG. 10 is a schematic diagram of an SUL cell that includes a plurality of NCIF identifiers.

Optionally, an example in which one SUL cell including a plurality of NCIF identifiers is configured by using RRC signaling is shown in FIG. 10. A 3.5 G downlink (DL) carrier and a 3.5 G uplink (UL) carrier are associated with an NCIF 0; and a 1.8 G SUL carrier is associated with an NCIF 1, or the 3.5 G DL carrier and the 1.8 G SUL carrier are associated with the NCIF 1. Therefore, the first carrier information and the second carrier information may be represented by using the NCIF identifier. If RRC configuration signaling includes both configuration information of a UL bandwidth BWP 1 on a UL CC and configuration information of a UL BWP 1 on an SUL CC or the RRC configuration signaling explicitly indicating to activate the UL CC and the SUL CC, a base station gNB may dynamically schedule PUSCH transmission on the UL CC and the SUL CC, or the RRC signaling is used to explicitly configure the gNB to dynamically schedule the PUSCH transmission on the UL CC and the SUL CC. Uplink scheduling grant information includes an NCIF value, and is used to indicate whether a scheduled PUSCH is transmitted on the 1.8 G SUL carrier or on the 3.5 G UL carrier. When the SUL cell includes a plurality of SUL carriers, a value of the NCIF identifier configured for the SUL cell is equal to 1 plus a quantity of SUL carriers.

A bandwidth may be a segment of contiguous resources in frequency domain. The bandwidth may be sometimes referred to as a bandwidth part (BWP), a carrier bandwidth part, a subband bandwidth, a narrowband bandwidth, or another name. The name is not limited in this application. For example, one BWP includes K (K>0) contiguous subcarriers. Alternatively, one BWP is a frequency domain resource in which N (N>0) non-overlapping contiguous resource blocks (RBs) are located, and a subcarrier spacing of the RB may be 15 kHz, 30 kHz, 60 kHz, 120 kHz, 240 kHz, 480 kHz, or another value. Alternatively, one BWP is a frequency domain resource in which M (M>0) non-overlapping contiguous resource block groups (RBGs) are located. One RBG includes P (P>0) contiguous RBs, and a subcarrier spacing of the RB may be 15 kHz, 30 kHz, 60 kHz, 120 kHz, 240 kHz, 480 kHz, or another value.

Part 102. The UE receives the configuration information, and determines the SRS switching-from uplink carrier and the SRS switching-to uplink carrier based on the configuration information.

For example, the UE may determine the SRS switching-from uplink carrier based on the first uplink carrier information, and determines the SRS switching-to uplink carrier based on the second uplink carrier information.

For example, after the configuration information is parsed, the UE determines the SRS switching-from uplink carrier based on the first uplink carrier information, and determines the SRS switching-to uplink carrier based on the second uplink carrier information. As shown in FIG. 5, if the first uplink carrier information includes the identifier of cell 1 and the identifier of the 3.5 G UL carrier, the SRS switching-from uplink carrier is the 3.5 G UL carrier in cell 1. As shown in FIG. 6, if the second uplink carrier information includes the identifier of cell 1 and the identifier of the 3.5 G UL carrier, the SRS switching-to uplink carrier is the 3.5 G UL carrier in cell 1. As shown in FIG. 9, if the first uplink carrier information includes the NCIF 1, the SRS switching-from uplink carrier is the 3.5 G UL carrier in the cell 2.

According to an SRS transmission method provided in this embodiment of this application, the network device sends, to the UE, the configuration information that includes the first uplink carrier information and the second uplink carrier information. The UE determines the SRS switching-from uplink carrier based on the first uplink carrier information, and determines the SRS switching-to uplink carrier based on the second uplink carrier information. When the SUL cell is used as the switching-from UL CC, whether the RF capability of the SUL or the RF capability of the non-SUL is used may be determined. When the SUL cell is used as the switching-to UL CC, whether to transmit the SRS on the SUL carrier or the non-SUL carrier may be determined. In this way, the reliability of the SRS transmission is ensured.

Figure 11:
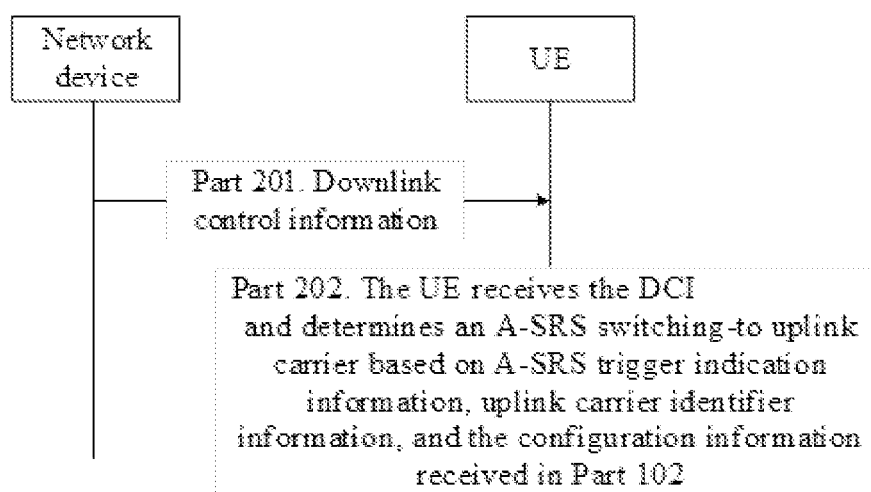
FIG. 11 is a flowchart of a wireless communication method according to another embodiment of this application.

FIG. 11 is a flowchart of a wireless communication method according to another embodiment of this application. Based on the embodiment shown in FIG. 4, the method further includes the following:

Part 201. A network device sends downlink control information DCI to UE.

For example, the DCI includes aperiodic A-SRS trigger indication information and an uplink carrier identifier. The uplink carrier identifier is used to indicate a second uplink carrier.

In this embodiment, if the UE is configured with only one serving cell and the serving cell is an SUL cell, or an SRS switching-to uplink carrier of the UE is an SUL cell, when a configured SRS is an A-SRS, it needs to be further indicate that an A-SRS triggered by DL-DCI or group-level DCI on the SUL cell is an A-SRS on which uplink carrier. Therefore, an uplink carrier on which the A-SRS is triggered may be indicated by using the DCI.

Optionally, configuration information includes an A-SRS identifier, and the A-SRS identifier is associated with the second uplink carrier.

In this embodiment, A-SRS resources on an SUL carrier and a non-SUL carrier in a cell may be uniformly numbered, and each A-SRS identifier (index) is associated with one A-SRS on one UL CC. For example, A-SRS resources in FIG. 7 are uniformly numbered, and an A-SRS index 1 is associated with the 3.5 G UL carrier in the cell 1, an A-SRS index 2 is associated with the 1.8 G SUL carrier in the cell 1, an A-SRS index 3 is associated with the 3.5 G UL carrier in the cell 2, and an A-SRS index 4 is associated with the 1.8 G SUL carrier in the cell 2. A corresponding uplink carrier may be determined based on the A-SRS index. One uplink carrier may include a plurality of A-SRS resources, or the foregoing manner may be used to uniformly number the A-SRS resources.

Optionally, a 1-bit or multi-bit SUL CIF field may be added to each information block of the group-level DCI, and the SUL CIF field is used to indicate the second uplink carrier.

In a design, a quantity of bits required in each information block is related to a quantity of uplink carriers included in the SUL cell. It is assumed that N bits are required, and the quantity of uplink carriers is M. In this case, $N=\log_2 M$.

Optionally, the DCI carries the A-SRS trigger indication information, and the uplink carrier information may be predefined as a non-SUL carrier.

Optionally, an implementation of determining the SRS switching-to uplink carrier based on the configuration information in Part 102 includes the following:

Part 202. The UE receives the DCI, and determines an A-SRS switching-to uplink carrier based on the A-SRS trigger indication information and the uplink carrier identifier information in the DCI, and the configuration information received in Part 102.

In this embodiment, after second uplink carrier information is configured in the configuration information, if the SRS is the A-SRS, the SRS switching-to uplink carrier needs to be determined based on the second uplink carrier information, the A-SRS trigger indication information, and the uplink carrier identifier information.

Optionally, when the configured SRS is a semi-persistent SPS-SRS, refer to the method in FIG. 11.

According to the SRS transmission method provided in this embodiment of this application, the network device sends, to the UE, the DCI that carries the A-SRS trigger indication information and/or the uplink carrier identifier information. The UE determines the SRS switching-to uplink carrier based on the second uplink carrier information, the A-SRS trigger indication information, and the uplink carrier identifier information. In a special SRS scenario, the SRS switching-from uplink carrier and the SRS switching-to uplink carrier may also be determined. Therefore, the method may be applied in more scenarios.

Optionally, based on any embodiment in FIG. 4 to FIG. 11, the configuration information is further used to indicate a location of an uplink carrier in an information block of UE-group-level DCI, the uplink carrier is not used to transmit a PUSCH/PUCCH, and the information block of the UE-group-level DCI includes at least one of SRS power control information, A-SRS trigger indication information, and uplink carrier identifier information of the uplink carrier that is not used to transmit the PUSCH/PUCCH.

In this embodiment, if the UE is configured with a maximum of N (N is a positive integer, for example, N is 4 or another value) uplink carriers that are not used to transmit the PUSCH/PUCCH, the UE group-level DCI (group DCI) includes a plurality of information blocks, and each information block includes at least one of the SRS power control information, the A-SRS trigger indication information, and the uplink carrier identifier information of the uplink carrier that is not used to transmit the PUSCH/PUCCH. The configuration information indicates the location of the uplink carrier in the information block of the UE-group-level DCI, that is, the configuration information indicates the second uplink carrier, where the uplink carrier is not used to transmit the PUSCH/PUCCH. For example, the configuration information indicates the corresponding location of the uplink carrier in the information block of the UE-group-level DCI, where the uplink carrier is not used to transmit the PUSCH/PUCCH. To be specific, the information block includes at least one of the second uplink carrier identifier information, power control information, or the A-SRS trigger indication information.

For example, when the UE is configured with a maximum of four PUSCH/PUCCH-less carriers, RRC signaling carries a dedicated physical resource configuration information element of an SCell. The dedicated physical resource configuration information element of the SCell includes a transmit power control (TPC) configuration information element of typeB, and the configuration information element is used to configure a corresponding block location of the SCell in the group-level DCI. One UE is configured with a maximum of four blocks in the group-level DCI. When a periodic P-SRS needs to be transmitted on the PUSCH/PUCCH-less carrier, group-level DCI signaling includes only TPC signaling. When the A-SRS is configured on the PUSCH/PUCCH-less carrier, the group-level DCI signaling includes at least one of the TPC signaling, the A-SRS trigger indication information, or the uplink carrier indication information. When the SPS-SRS is configured on the PUSCH/PUCCH-less carrier, the group-level DCI signaling includes at least one of the TPC signaling, SPS-SRS activation/deactivation signaling, or the uplink carrier indication information.

As shown in Code 6, the TPC configuration information element of typeB is configured in PhysicalConfigDedicated.

Code 6:

```
PhysicalConfigDedicatedSCell::=    SEQUENCE {
     ...,
                    typeB-SRS-TPC-PDCCH-Config    SRS-TPC-PDCCH-Config
OPTIONAL,           -- Need ON    <=4 SRS-only CCs
     ...,
}
```

Optionally, the configuration information further includes an index of a carrier group to which the uplink carrier that is not used to transmit the PUSCH/PUCCH belongs and an index of a carrier in the group.

In this embodiment, if the UE is configured to include more than N (N is a positive integer, for example, N=4 or other values) uplink carriers that are not used to transmit the PUSCH/PUCCH, and the more than N uplink carriers that are not used to transmit the PUSCH/PUCCH are configured into M groups, the configuration information further includes an index of a group to which the uplink carrier that is not used to transmit the PUSCH/PUCCH belongs and the the PUSCH/PUCCH-less carrier, a block of the group-level DCI signaling includes the index of the carrier group and the TPC signaling, SPS-SRS activation/deactivation signaling is triggered by the downlink DCI or a media access control (MAC) control element (CE). One UE corresponds to one block in the group-level DCI signaling. The index of the carrier group in the block of the group-level DCI signaling is used to indicate a triggered carrier group, and a TPC field in the block indicates an SRS power control command on a corresponding second uplink carrier.

As shown in Code 7, the TPC configuration information element of typeA is configured in physicalconfigdedicated.

| Code 7: |
| --- |
| PhysicalConfigDedicated ::=    SEQUENCE { |
| ..., |
| [[ typeA-SRS-TPC-PDCCH-Group    SEQUENCE (SIZE (1..16)) OF SRS-TPC-PDCCH-Config    OPTIONAL,    -- Need ON    each group contains at most 4 SRS-only CCs(PUSCH/PUCCH less CCs) |
| ..., |
| } |
| SRS-TPC-PDCCH-Config::=    CHOICE { |
|     release    NULL, |
|     setup    SEQUENCE { |
|         srs-TPC-RNTI-r14    BIT STRING (SIZE (16)), |
|         startingBitOfFormat3B-r14    INTEGER (0..15), |
|         fieldTypeFormat3B-r14    INTEGER (1..4), TPC: 1/3 1bit; 2/4 2bits |
|         srs-CC-SetIndexlist-r14 |
|         SEQUENCE (SIZE(1..4)) OF SRS-CC-SetIndex-r14    OPTIONAL --    Cond Srs-Trigger-TypeA    (if > 4 SRS-only CCs) |
|     } |
| } |
| SRS-CC-SetIndex-r14 ::=    SEQUENCE { |
|     ccSetIndex-r14    INTEGER (0..3), |
|     ccIndexInOneCcSet-r14    INTEGER (0..3) |
| } | uplink carrier identifier, and the second uplink carrier may be determined based on the index of the group and the uplink carrier identifier.

For example, when the UE is configured with more than four PUSCH/PUCCH-less carriers, the RRC signaling carries a dedicated physical resource configuration information element. The dedicated physical resource configuration information element includes a TPC configuration information element of typeA, and the configuration information element of typeA is used to configure an index of a carrier group (CCSetIndex) to which the PUSCH/PUCCH-less carrier belongs and an index of a carrier in the group (CCIndexInOneCcSet). The TPC configuration information element of typeA may include all PUSCH/PUCCH-less carrier information. When the P-SRS needs to be transmitted on the PUSCH/PUCCH-less carrier, an information block of the group-level DCI signaling includes the index of the carrier group and the TPC signaling. When the A-SRS is configured on the PUSCH/PUCCH-less carrier, a block of the group-level DCI signaling includes the index of the carrier group and the TPC signaling, the A-SRS is triggered by downlink DCI, and the downlink DCI includes uplink carrier index indication information. When the SPS-SRS is configured on Optionally, if SRS carrier switching is performed between the non-SUL carrier and the SUL carrier in the SUL cell, the switching-from UL CC may be indicated during configuration of a UE-level SRS resource.

For example, the UE is configured to transmit the PUSCH and the SRS on a 1.8 G SUL carrier, and to transmit only the SRS on a 3.5 G non-SUL carrier. A dedicated physical configuration information element of the 3.5 G non-SUL carrier includes only UE-level dedicated SRS configuration information, and the dedicated SRS configuration information may include A-SRS configuration information, P-SRS configuration information, and SPS-SRS configuration information. Therefore, in Code 8, a field srs-swtichFromServCellIndex is an optional field. If the field srs-swtichFromServCellIndex exists, a configured value is NCIF $_2$. This means that SRS transmission on the 3.5 G non-SUL carrier needs to use a radio frequency module of the SUL. If the field srs-swtichFromServCellIndex does not exist, the SRS transmission on the 3.5 G non-SUL carrier does not need to use the radio frequency module of the SUL carrier.

An implementation of indicating the switching-from UL CC during configuration of the UE-level SRS resource is shown in Code 8.

| Code 8: |
| --- |
| RadioResourceConfigDedicated::=    SEQUENCE { |
| ..., |
| sCellIndex    NCIF$_1$    OPTIONAL |
| physicalConfigDedicated    PhysicalConfigDedicated OPTIONAL, -- Need ON |

-continued

Code 8:

```
    sCellIndex                          NCIF2                           OPTIONAL
    SULphysicalConfigDedicated          PhysicalConfigDedicated OPTIONAL, -- Need ON
    dynamicScheduling                   True/False                      OPTIONAL
    ...,
  }
  PhysicalConfigDedicated ::=           SEQUENCE {
    ...,
    soundingRS-UL-ConfigDedicated       SoundingRS-UL-ConfigDedicated
OPTIONAL,  -- Need ON
    srs-SwitchFromServCellIndex-r14     INTEGER (0.. 16)   OPTIONAL        --
NeedON(NCIF2)
    ...,
  }
  SULPhysicalConfigDedicated ::=        SEQUENCE {
    pucch-ConfigDedicated               PUCCH-ConfigDedicated   OPTIONAL,   --
Need ON
    pusch-ConfigDedicated               PUSCH-ConfigDedicated           OPTIONAL, -- Need
ON
    uplinkPowerControlDedicated         UplinkPowerControlDedicated
OPTIONAL,  -- Need ON
      tpc-PDCCH-ConfigPUCCH             TPC-PDCCH-Config                OPTIONAL,   --
    Need ON
        tpc-PDCCH-ConfigPUSCH           TPC-PDCCH-Config                OPTIONAL,   --
    Need ON
      cqi-ReportConfig                  CQI-ReportConfig                OPTIONAL,   --
    Cond CQI-r8
        soundingRS-UL-ConfigDedicated   SoundingRS-UL-ConfigDedicated   OPTIONAL,
-- Need ON
  }
```

An embodiment of this application further provides a communications apparatus. The communications apparatus is configured to perform the method according to any one of the foregoing embodiments. The communications apparatus includes a necessary means to execute the foregoing method embodiments. The means may be implemented by using software and/or hardware. The communications apparatus may be the network device or the terminal in FIG. 1 and FIG. 2.

Figure 12:
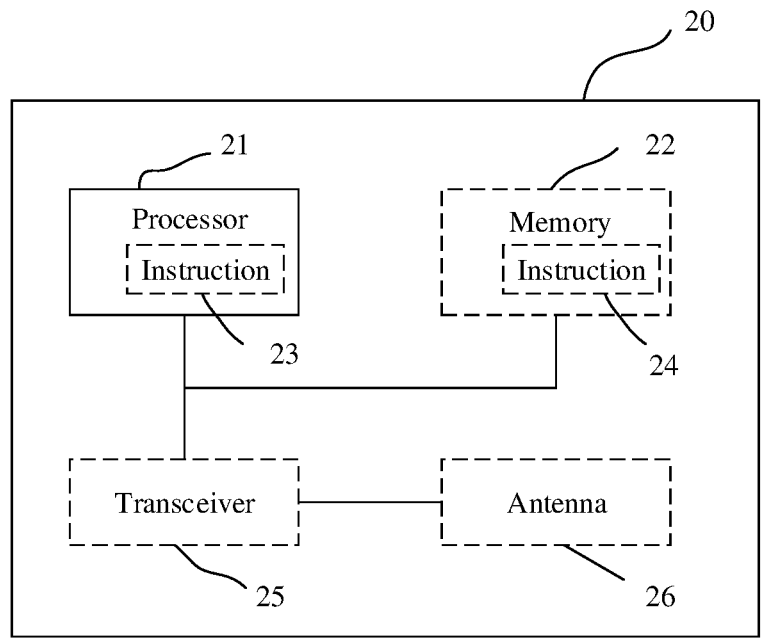
FIG. 12 is a schematic structural diagram of a network device according to this application.

FIG. 12 is a schematic structural diagram of a communications apparatus. The communications apparatus 20 may be the network device 20 in FIG. 1 and FIG. 2. The network device may be configured to implement the methods described in the foregoing method embodiments. For details, refer to the descriptions in the foregoing method embodiments.

The communications apparatus 20 includes one or more processors 21. The processor 21 may be a general-purpose processor, a dedicated processor, or the like. For example, the processor 21 may be a baseband processor or a central processing unit. The baseband processor may be configured to process a communications protocol and communication data. The central processing unit may be configured to: control the communications apparatus (for example, a base station, a baseband chip, a DU, or a CU), execute a software program, and process data of the software program.

In an optional design, the processor 21 may also include instruction(s) 23. The instructions 23 may run on the processor 21, and cause the communications apparatus 20 to perform the methods described in the foregoing method embodiments.

In another possible design, the communications apparatus 20 may include a circuit. The circuit may implement the sending or receiving function in the foregoing method embodiments.

Optionally, the communications apparatus 20 may include one or more memories 22. The memory 22 stores instruction(s) 24. The instructions may run on the processor 21, and cause the communications apparatus 20 to perform the methods described in the foregoing method embodiments. Optionally, the memory may further store data. Optionally, the processor may alternatively store instruction(s) and/or data. The processor and the memory may be separately disposed, or may be integrated together.

Optionally, the communications apparatus 20 may further include a transceiver 25 and/or an antenna 26. The processor 21 may be referred to as a processing unit, and controls the communications apparatus (a terminal or a base station). The transceiver 25 may be referred to as a transceiver unit, a transceiver machine, a transceiver circuit, a transceiver, or the like, and is configured to implement sending and/or receiving functions of the communications apparatus by using the antenna 26.

In a design, the communications apparatus (for example, an integrated circuit, a wireless device, a circuit module, a network device, or a terminal device) may include a processor and a transceiver. For example, when the apparatus is configured to implement a function of the network device, the transceiver may send the configuration information to the UE in FIG. 4, or the transceiver sends the DCI to the UE in FIG. 11. For example, when the apparatus is configured to implement a function of the terminal, in FIG. 4, the transceiver may receive the configuration information, and the processor determines, based on the configuration information, the SRS switching-from uplink carrier and the SRS switching-to uplink carrier for the SRS carrier switching; or in FIG. 11, the transceiver may receive the DCI, and the processor determines the switching-to uplink carrier of the A-SRS transmission based on the second uplink carrier information, the A-SRS trigger indication information, and the uplink carrier identifier information.

The processor and the transceiver described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may also be manufactured by using various IC technologies, for example, a complementary metal oxide semiconductor (CMOS), an nMetal-oxide-semiconductor (NMOS), a positive channel metal oxide semiconductor (PMOS), a bipolar junction transistor (Bipolar Junction Transistor, BJT), a bipolar CMOS (BiCMOS), silicon germanium (SiGe), and gallium arsenide (GaAs).

The communications apparatus described in this application may be an independent device or may be a part of a relatively large device. For example, the device may be as follows:

(1) an independent integrated circuit IC or a chip;
(2) a set of one or more ICs, where optionally, the IC set may also include a storage component configured to store data and/or instruction(s);
(3) an ASIC, for example, a modem (MSM);
(4) a module that can be embedded in another device;
(5) a receiver, a cellular phone, a wireless device, a hand held device, a mobile unit, a network device, or the like; and
(6) another device, and the like.

Figure 13:
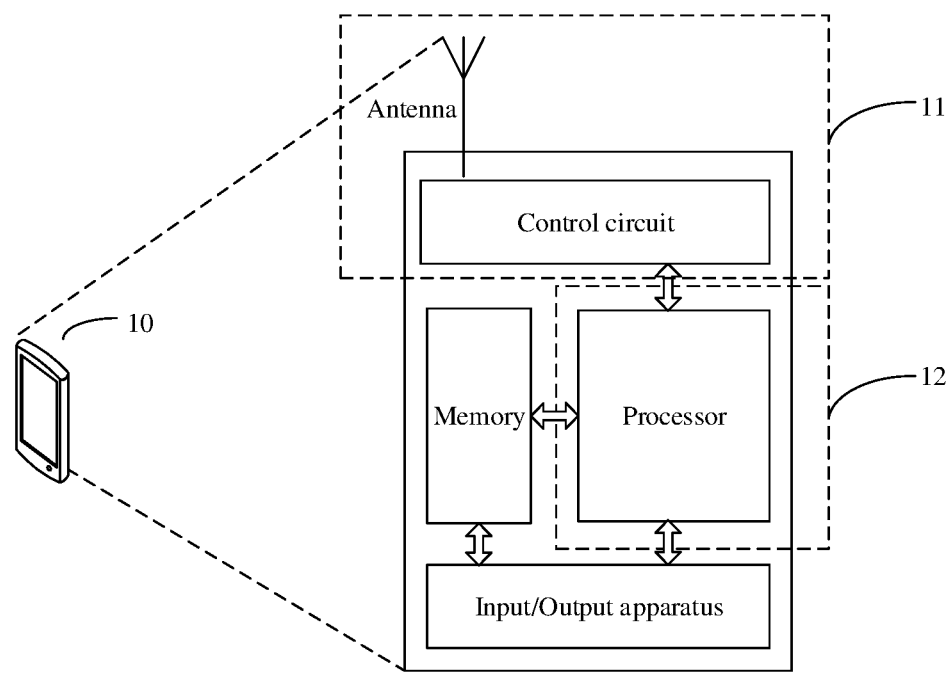
FIG. 13 is a schematic structural diagram of a terminal according to this application.

FIG. 13 is a schematic structural diagram of a terminal. UE may be applied to the system shown in FIG. 1. For ease of description, FIG. 13 shows only main components of the terminal. As shown in FIG. 13, a terminal 10 includes a processor, a memory, a control circuit, an antenna, and an input/output apparatus. The processor is mainly configured to: process a communications protocol and communication data, control the entire terminal, execute a software program, and process data of the software program. The memory is mainly configured to store the software program and the data. A radio frequency circuit is mainly configured to: perform conversion between a baseband signal and a radio frequency signal, and process the radio frequency signal. The antenna is mainly configured to receive and transmit a radio frequency signal in an electromagnetic wave form. The input/output apparatus such as a touchscreen, a display screen, or a keyboard is mainly configured to: receive data entered by a user, and output data to the user.

After the user equipment is turned on, the processor may read a software program stored in a storage unit, explain and execute instruction(s) of the software program, and process data of the software program. When data needs to be sent in a wireless manner, the processor performs baseband processing on the to-be-sent data, and outputs a baseband signal to a radio frequency circuit. After the radio frequency circuit performs radio frequency processing on the baseband signal, a radio frequency signal is sent by using the antenna in an electromagnetic wave form. When data is sent to the user equipment, the radio frequency circuit receives a radio frequency signal by using the antenna, converts the radio frequency signal into a baseband signal, and outputs the baseband signal to the processor. The processor converts the baseband signal into data and processes the data.

A person skilled in the art may understand that, for ease of description, FIG. 13 shows only one memory and one processor. Actually, the terminal may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communications protocol and the communication data. The central processing unit is mainly configured to: control the entire user equipment, execute the software program, and process the data of the software program. The processor in FIG. 13 integrates functions of the baseband processor and the central processing unit. A person skilled in the art may understand that the baseband processor and the central processing unit may alternatively be independent processors, and are interconnected by using technologies such as a bus. A person skilled in the art may understand that the user equipment may include a plurality of baseband processors to adapt to different network standards, the user equipment may include a plurality of central processing units to enhance a processing capability of the user equipment, and various components of the user equipment may be connected by using various buses. The baseband processor may also be expressed as a baseband processing circuit or a baseband processing chip. The central processing unit may also be expressed as a central processing circuit or a central processing chip. A function of processing the communications protocol and the communication data may be embedded into the processor, or may be stored in the storage unit in a form of a software program. The processor executes the software program to implement a baseband processing function.

For example, in this embodiment of the present invention, the antenna and a control circuit that have sending and/or receiving functions may be considered as a transceiver unit 11 of the UE 10, and the processor having a processing function may be considered as a processing unit 12 of the UE 10. As shown in FIG. 13, the UE 10 includes the transceiver unit 11 and the processing unit 12. The transceiver unit may also be referred to as a transceiver, a transceiver machine, a transceiver apparatus, or the like. Optionally, a component that is in the transceiver unit 11 and that is configured to implement a receiving function may be considered as a receiving unit, and a component that is in the transceiver unit 11 and that is configured to implement a sending function may be considered as a sending unit. In other words, the transceiver unit 11 includes the receiving unit and the sending unit. For example, the receiving unit may also be referred to as a receiver machine, a receiver, a receiver circuit, or the like, and the sending unit may be referred to as a transmitter machine, a transmitter, a transmit circuit, or the like.

This application further provides a computer storage medium, including instruction(s). When the instructions run on a computer, the computer performs a technical solution on a terminal side according to the foregoing method embodiments.

This application further provides a computer storage medium, including instruction(s). When the instructions run on a computer, the computer performs a technical solution on a network device side according to the foregoing method embodiments.

This application further provides a computer program product. When the computer program product runs on a computer, the computer performs a technical solution on a terminal side according to the foregoing method embodiments.

This application further provides a computer program product. When the computer program product runs on a computer, the computer performs a technical solution on a network device side according to the foregoing method embodiments.

A person skilled in the art may further understand that various illustrative logic blocks and steps that are listed in the embodiments of this application may be implemented by using electronic hardware, computer software, or a combination thereof. Whether the functions are implemented by using hardware or software depends on a particular application and a design requirement of an entire system. A person skilled in the art may use various methods to implement the described functions for each particular application, but it should not be considered that the implementation goes beyond the scope of the embodiments of this application.

The various illustrative logic units and circuits described in the embodiments of this application may implement or operate the described functions by using a general-purpose processor, a digital signal processor, an application-specific integrated circuit (ASIC), a field programmable gate array (FPGA) or another programmable logic apparatus, a discrete gate or transistor logic, a discrete hardware component, or a design of any combination thereof. The general-purpose processor may be a microprocessor. Optionally, the general-purpose processor may be any conventional processor, controller, microcontroller, or state machine. The processor may be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium in any other form in the art. For example, the storage medium may be connected to a processor, so that the processor can read information from the storage medium and write information to the storage medium. Optionally, the storage medium may be integrated into a processor. The processor and the storage medium may be disposed in an ASIC, and the ASIC may be disposed in UE. Optionally, the processor and the storage medium may alternatively be disposed in different components of the UE.

All or some of the foregoing embodiments may be implemented by using software, hardware, firmware, or any combination thereof. When being implemented by using software, all or some of the embodiments may be implemented in a form of a computer program product. The computer program product includes one or more computer instructions (sometimes may alternatively be referred to as computer programs). When the computer instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer readable storage medium or transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any available medium accessible to the computer, or a data storage device, such as a server or a data center integrating one or more available media. The available medium may be a magnetic medium (for example, a floppy disk, a hard disk, or a magnetic tape), an optical medium (for example, a DVD), a semiconductor medium (for example, a solid state disk (SSD)), or the like.

In this application, the term "including" and a variant thereof may refer to non-limitative inclusion; the term "or" and a variant thereof may refer to "and/or". In this application, the terms "first", "second", and the like are intended to distinguish between similar objects but do not necessarily indicate a specific order or sequence. "A plurality of" in this application refers to two or more than two. The term "and/or" describes an association relationship between associated objects and represents that three relationships may exist. For example, A and/or B may represent the following three cases: Only A exists, both A and B exist, and only B exists. The character "/" generally indicates an "or" relationship between the associated objects.

The content disclosed in this application is not limited to the described embodiments and designs, but may further be extended to a maximum scope that is consistent with the principles of this application and new features disclosed in this application.

The invention claimed is:

1. An apparatus comprising:
    at least one processor; and
    a non-transitory computer readable medium storing a program executable by the at least one processor, the program comprising instructions for:
        receiving configuration information, wherein the configuration information comprises first uplink carrier information and second uplink carrier information, wherein the first uplink carrier information indicates that a first uplink carrier is a switching-from uplink carrier for a sounding reference signal (SRS) carrier switching, the second uplink carrier information indicates that a second uplink carrier is a switching-to uplink carrier for the SRS carrier switching, and the first uplink carrier belongs to a cell comprising a non-supplementary uplink (SUL) carrier and a SUL carrier, and wherein the first uplink carrier information comprises a cell index of the cell and further comprises an uplink carrier identifier, and the uplink carrier identifier indicates whether the switching-from uplink carrier is the non-SUL carrier or the SUL carrier; and
        determining, based on the configuration information, the switching-from uplink carrier and the switching-to uplink carrier for the SRS carrier switching.

2. The apparatus according to claim 1, wherein the second uplink carrier information comprises information indicating a switching-to cell and information indicating the switching-to uplink carrier.

3. The apparatus according to claim 1, wherein the configuration information is carried in radio resource control (RRC) signaling.

4. The apparatus according to claim 3, wherein the RRC signaling is RRC connection setup signaling, RRC connection reestablishment signaling, or RRC connection reconfiguration signaling.

5. The apparatus according to claim 1, the program further comprising instructions for:
    receiving downlink control information (DCI), wherein the DCI carries aperiodic sounding reference signal (A-SRS) trigger indication information and an uplink carrier identifier of the second uplink carrier.

6. The apparatus according to claim 1, wherein when a cell to which the second uplink carrier belongs comprises an SUL carrier, the second uplink carrier is a non-SUL carrier.

7. The apparatus according to claim 1, wherein the first uplink carrier is a non-physical uplink control channel (non-PUCCH) carrier.

8. An apparatus comprising:
at least one processor; and
a non-transitory computer readable medium storing a program executable by the at least one processor, the program comprising instructions for:
sending configuration information, wherein the configuration information comprises first uplink carrier information and second uplink carrier information, wherein the first uplink carrier information indicates that a first uplink carrier is a switching-from uplink carrier for a sounding reference signal (SRS) carrier switching, the second uplink carrier information indicates that a second uplink carrier is a switching-to uplink carrier for the SRS carrier switching, and the first uplink carrier belongs to a cell comprising a non-supplementary uplink (SUL) carrier and a supplementary uplink SUL carrier, and wherein the first uplink carrier information comprises a cell index of the cell and further comprises an uplink carrier identifier, and the uplink carrier identifier indicates whether the switching-from uplink carrier is the non-SUL carrier or the SUL carrier.

9. The apparatus according to claim 8, wherein the second uplink carrier information comprises information indicating a switching-to cell and information indicating the switching-to uplink carrier.

10. The apparatus according to claim 8, wherein the configuration information is carried in radio resource control (RRC) signaling.

11. The apparatus according to claim 10, wherein the RRC signaling is RRC connection setup signaling, RRC connection reestablishment signaling, or RRC connection reconfiguration signaling.

12. The apparatus according to claim 8, the program further comprising instructions for:
sending downlink control information (DCI), wherein the DCI carries aperiodic sounding reference signal (A-SRS) trigger indication information and an uplink carrier identifier of the second uplink carrier.

13. The apparatus according to claim 8, wherein when a cell to which the second uplink carrier belongs comprises an SUL carrier, the second uplink carrier is a non-SUL carrier.

14. The apparatus according to claim 8, wherein the first uplink carrier is a non-physical uplink control channel (non-PUCCH) carrier.

15. A method, comprising:
sending configuration information, wherein the configuration information comprises first uplink carrier information and second uplink carrier information, wherein the first uplink carrier information indicates that a first uplink carrier is a switching-from uplink carrier for a sounding reference signal (SRS) carrier switching, the second uplink carrier information indicates that a second uplink carrier is a switching-to uplink carrier for the SRS carrier switching, and the first uplink carrier belongs to a cell comprising a non-supplementary uplink (SUL) carrier and a supplementary uplink SUL carrier, and wherein the first uplink carrier information comprises a cell index of the cell and further comprises an uplink carrier identifier, and the uplink carrier identifier indicates whether the switching-from uplink carrier is the non-SUL carrier or the SUL carrier.

16. The method according to claim 15, wherein the second uplink carrier information comprises information indicating a switching-to cell and information indicating the switching-to uplink carrier.

17. The method according to claim 15, wherein the configuration information is carried in radio resource control (RRC) signaling.

18. The method according to claim 17, wherein the RRC signaling is RRC connection setup signaling, RRC connection reestablishment signaling, or RRC connection reconfiguration signaling.

19. The method according to claim 15, further comprising:
sending downlink control information (DCI), wherein the DCI carries aperiodic sounding reference signal (A-SRS) trigger indication information and an uplink carrier identifier of the second uplink carrier.

20. The method according to claim 15, wherein the first uplink carrier is a non-physical uplink control channel (non-PUCCH) carrier.

* * * * *